Aug. 5, 1924.
M. BAKER
1,503,781
TILTABLE VEHICLE PLATFORM
Filed Jan. 10, 1923
2 Sheets-Sheet 1
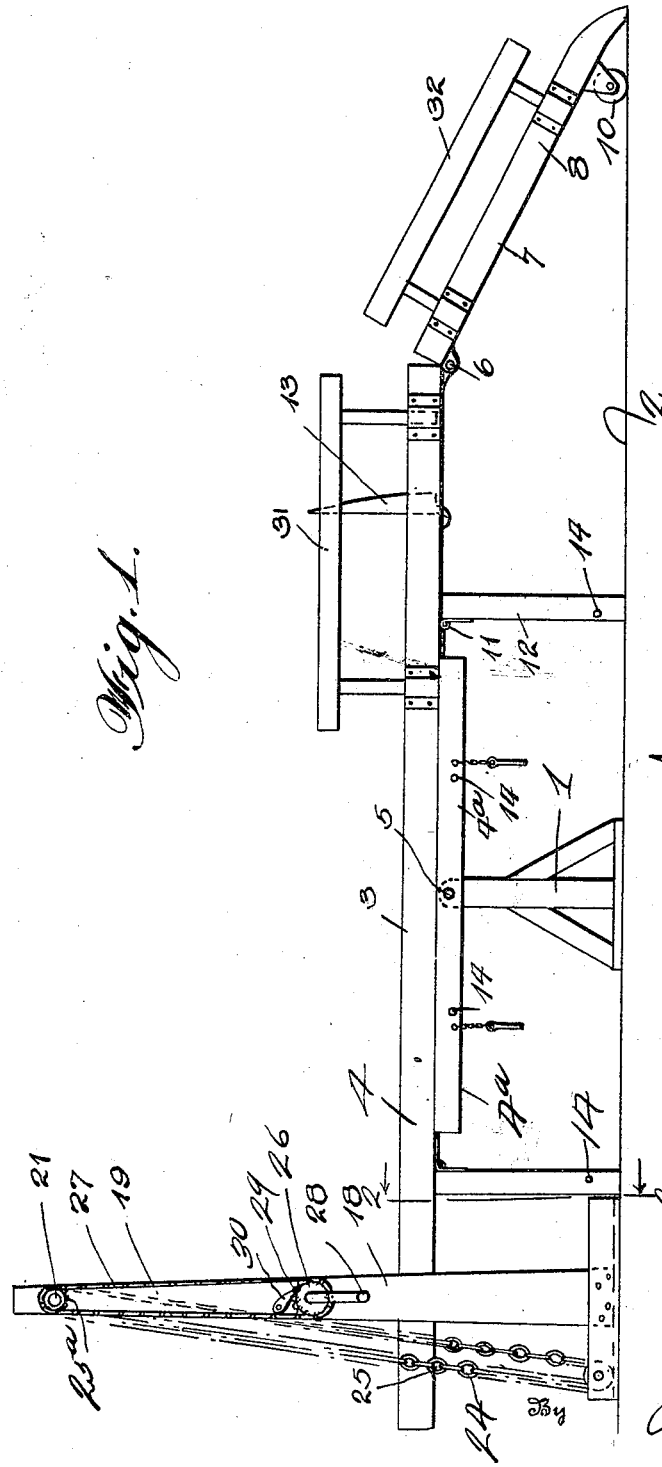
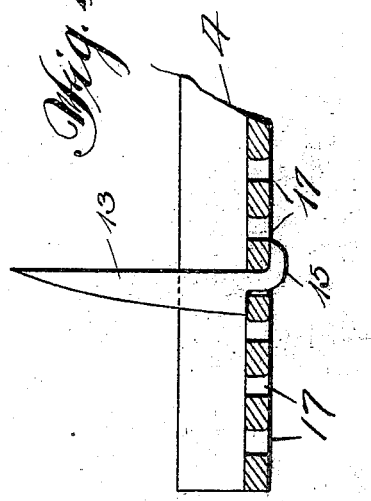
Inventor
Myron Baker
By D. Swift
Attorney

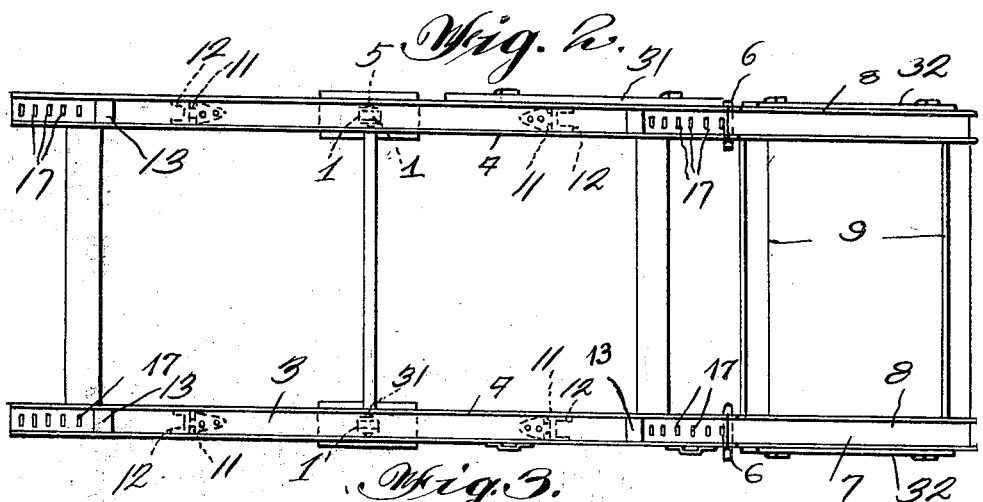

Patented Aug. 5, 1924.

1,503,781

UNITED STATES PATENT OFFICE.

MYRON BAKER, OF BRIDGEPORT, CONNECTICUT.

TILTABLE VEHICLE PLATFORM.

Application filed January 10, 1923. Serial No. 611,754.

*To all whom it may concern:*

Be it known that I, MYRON BAKER, a citizen of the United States, residing at Bridgeport, in the county of Fairfield, State of Connecticut, have invented a new and useful Tiltable Vehicle Platform; and I do hereby declare the following to be a full, clear, and exact description of the invention, such as will enable others skilled in the art to which it appertains to make and use the same.

The invention relates to tiltable vehicle platforms, and has for its object to provide a device of this character which is pivotally mounted to move in a vertical plane and pivoted substantially centrally thereof, whereby a vehicle, such for instance as an automobile when disposed thereon, the weight of the vehicle will be equally distributed in relation to the pivotal point of the platform, whereby the platform will be substantially counterpoise and may be easily moved to various angles in a vertical plane.

A further object is to provide the underside of the platform with pivoted legs, which legs may be utilized for engaging the floor and rigidly holding the platform in a horizontal position.

A further object is to provide a pivotally connected and detachable approach connected to one end of the pivoted platform for guiding the wheels of the vehicle onto the plaform.

A further object is to provide wheel engaging stops, which stops may be positioned at various points in relation to the pivotal point of the platform for properly centering various types of vehicles on the platform in relation to the pivotal point of the platform.

A further object is to provide means cooperating with one of the ends of the pivoted platform, whereby the platform may be tilted and held at various angles.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a side elevation of the device, showing the same in position for the reception of a vehicle.

Figure 2 is a vertical transverse sectional view through the device taken on line 2—2 of Figure 1.

Figure 3 is a top plan view of the device.

Figure 4 is a detail sectional view longitudinally through a portion of one of wheel receiving channels showing the removable wheel engaging member.

Referring to the drawings, the numeral 1 designates spaced vertically disposed brackets, which brackets may be secured to the floor 2 in any suitable manner. The platform 3 is formed from spaced channels 4, which are in parallel relation to each other and in which channels vehicle wheels are received. Extending downwardly from the undersides of the channels $3^a$ are stiffening bars 4 and to which stiffening bars, the brackets 1 are pivotally connected at 5, in such manner that the platform as a whole will balance on its pivotal points normally, and when a vehicle is disposed on the platform, consequently the pivotal points 5 are located substantially centrally in relation to the ends of the platform. Pivotally and detachably connected to one end of the platform 3 at 6 is an inclined approach 7, which approach is formed from spaced channels 8, connected together by bars 9, said channels 8 receiving the wheels of the automobile when it is driven thereon, however the lower ends of the approach channels 8 are provided with supporting wheels 10, which wheels engage the floor and form means whereby, when the approach is disconnected, the approach may be moved away from the device. Hingedly connected to the undersides of the channels $3^a$ at 11 are supporting legs 12, which legs when in extending position, as shown in Figure 1, engage the floor and maintain the platform 3 in a horizontal position, especially when the automobile is being positioned on the platform. After the automobile has been properly positioned on the platform 3, and the wheel engaging arms 13 positioned to engage the forward and rear wheels, the approach 7 is removed, the supporting legs 12 moved to a position where they may be held by means of pins passing through the apertures 14 in the legs and the stiffening bars 4 and the platform may be tilted in a plane vertically at various angles manually for the reason that the wheel engaging stops 13 have previously been properly positioned on the channels 3ª for centering the particular type of machine, in relation to the pivotal point 5 of the platform. The wheel engaging arms 13 are provided with hooked arms 15, which are received in any of the spaced apertures 17, in the bottoms of the channels 3ª, and as the apertures 17 are positioned for properly centering automobiles of standard wheel base, it is obvious that the operator may easily and quickly position the automobile on the platform for counterbalancing the platform.

If so desired a tilting mechanism 18 may be provided, which tilting mechanism comprises a U-shaped frame 19 adapted to arch one end of the tiltable platform, and movable inwardly and outwardly over the platform, said U-shaped frame has rotatably mounted in bearings 20, at the upper end thereof a transversely and horizontally disposed shaft 21. Disposed on the shaft 21 are chain pulleys 22, and extending over the chain pulleys 22 and chain pulleys 23, carried adjacent the lower ends of the U-shaped frame at opposite sides thereof, are endless chains 24. Connecting oppositely disposed portions of the chains is a transversely and horizontally disposed bar 25 adapted to engage under the end of the tiltable platform and when moved upwardly will tilt the platform and hold the same at the desired inclination, thereby allowing an operator to work under the machine if so desired. It will also be seen that when the tiltable platform is in a horizontal position as shown in Figure 1, the chains may be utilized for removing the engine therefrom or for any other purpose.

One of the ends of the shaft 21 is provided with a sprocket 25, and extending around said sprocket 25 and around a sprocket 26 is a sprocket chain 27, said sprocket 26 being carried by a crank 28, which when rotated by the operator will cause the sprockets 26 and 25, to rotate, and consequently the shaft 21 will rotate. The ratchet wheel 29 is provided and a pawl 30, whereby the platform may be held against displacement when positioned at various angles. The channels 3ª of the platform and the channels 8 of the approach are preferably provided with wheel guide rails 31 and 32, for preventing displacement of the wheels when passing over the approach and onto the platform.

From the above it will be seen that a tiltable platform is provided, which platform is counter-balanced and consequently may be easily tilted to various angles in a vertical plane by the operator for positioning the automobile where a mechanic may work underneath the automobile, or for draining the oil from the engine in the direction of the drain cock. It will also be seen that the device is simple in construction, the parts reduced to a minimum, and consequently cheaply constructed and sold.

The invention having been set forth what is claimed as new and useful is:—

The combination with a pivoted pivotal vehicle platform, of means for tilting said platform, said means comprising a U-shaped frame arching one end of the platform, endless chains at opposite sides of the platform, said chains extending over sprockets adjacent the upper and lower ends of the frame, a bar engaging the underside of one end of the platform and having its ends attached to the chains and means for rotating the sprockets adjacent one end of the U-shaped frame for raising the pivoted platform at its free end.

In testimony whereof I have signed my name to this specification in the presence of two subscribing witnesses.

MYRON BAKER.

Witnesses:
ABRAHAM LEVY,
SAMUEL B. PLOTBIY.